United States Patent
Wang et al.

[11] Patent Number: 6,010,599
[45] Date of Patent: *Jan. 4, 2000

[54] COMPACT VACUUM DISTILLATION DEVICE

[75] Inventors: Chungsing Wang, Los Angeles; Shui-Yiu Lo, Pasadena, both of Calif.

[73] Assignee: American Technologies Group, Inc., Monrovia, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/530,789

[22] Filed: Sep. 20, 1995

[51] Int. Cl.⁷ .............................. B01D 3/10; F25B 29/00
[52] U.S. Cl. .................. 202/205; 62/238.5; 62/238.7; 202/188; 202/269; 203/4; 203/91; 203/DIG. 4; 203/DIG. 11; 203/40
[58] Field of Search .................. 203/11, 91, DIG. 4, 203/87, 4, DIG. 11, 40; 202/197, 188, 186, 202, 269, 205; 159/901, DIG. 16, 47.3; 62/101, 238.5, 238.7

[56] References Cited

U.S. PATENT DOCUMENTS

| 3,637,465 | 1/1972 | Wilson | 203/11 |
| 4,181,577 | 1/1980 | Foley | 203/DIG. 4 |
| 4,209,364 | 6/1980 | Rothschild | 203/DIG. 4 |
| 4,214,454 | 7/1980 | Taylor | 203/DIG. 4 |
| 4,278,502 | 7/1981 | Stevens et al. | 202/206 |
| 4,390,396 | 6/1983 | Koblenzer | 203/DIG. 4 |
| 4,463,575 | 8/1984 | McCord | 203/DIG. 4 |
| 4,506,520 | 3/1985 | McCord | 203/DIG. 4 |
| 4,596,634 | 6/1986 | McCord | 203/DIG. 4 |
| 4,678,587 | 7/1987 | Voinche et al. | 203/10 |
| 4,755,261 | 7/1988 | McCord et al. | 203/100 |
| 4,985,122 | 1/1991 | Spencer | 203/11 |
| 5,053,111 | 10/1991 | Ellerbe, Jr. | 203/1 |
| 5,439,560 | 8/1995 | Kurematsu et al. | |

FOREIGN PATENT DOCUMENTS

| 427302 | 1/1934 | United Kingdom | 203/DIG. 4 |
| 1285572 | 8/1972 | United Kingdom | 203/DIG. 4 |

*Primary Examiner*—Virginia Manoharan
*Attorney, Agent, or Firm*—The Brotman Group; Harris F. Brotman

[57] ABSTRACT

An apparatus for batch distilling a liquid at sub-atmospheric pressure, without the aid of a vacuum pump. The apparatus includes an evaporator section having a valved entry port through which a batch of liquid in a first atmospheric condition is added to the evaporator section. A condenser section receives distillate and is in communication with the evaporator section. A valved vent is provided for sealing said apparatus from the outside atmosphere to form a second atmospheric condition which is sealed from the atmosphere after a heating element vaporizes said liquid into an initial sufficient amount of a first vapor to purge the first atmospheric condition from the apparatus through the valved vent. A condenser is disposed for condensing a sufficient amount of the first vapor to form a third atmospheric condition at a pressure below the first atmospheric condition, and for condensing a second vapor to produce distillate.

5 Claims, 5 Drawing Sheets

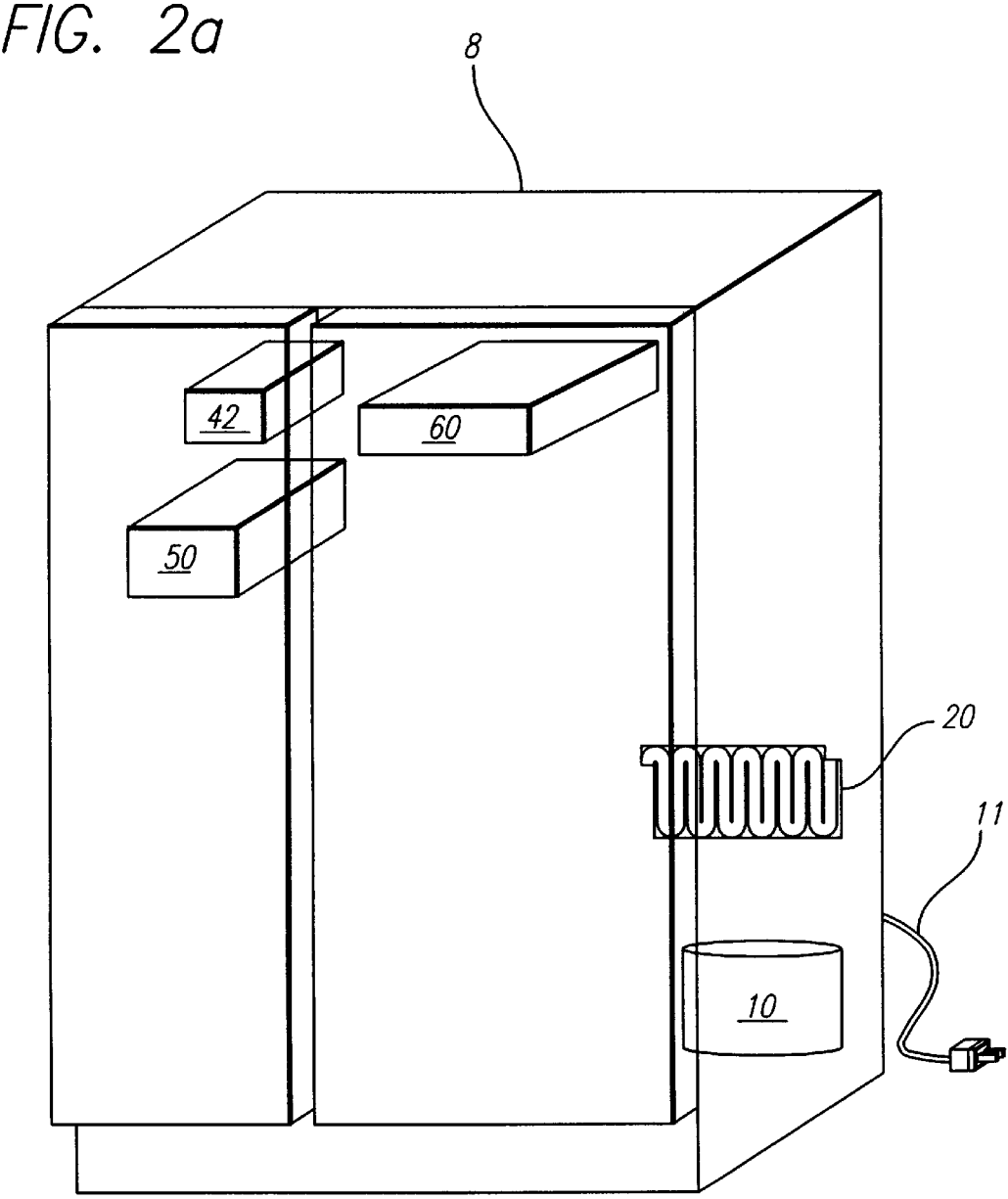

6,010,599

COMPACT VACUUM DISTILLATION DEVICE

BACKGROUND—FIELD OF THE INVENTION

This invention relates to vacuum distillation devices and specifically, to such devices that are compact and incorporate a refrigerant cycle and utilize components which result in low energy consumption.

BACKGROUND—PRIOR ART

The process of distillation has long been in use for the production of clean water and other liquids. The water enters a boiler where it is evaporated. The steam then passes through a cooling chamber where it condenses to form droplets of pure water that pass to the distillate outlet. Distillation is the only water purification process that removes, with certainty any solids contained in the feedwater.

There are a number of recognized disadvantages in the simple distillation system where water boils at 212° F. The first is the energy consumption required to boil the water and to remove the excess heat from the condensate. Another practical disadvantage is the tendency to scaling that occurs at higher temperatures. In the case of large-scale distillation systems, a number of solutions have already been developed. For instance multistage distillation, where some of the latent heat of evaporation is recovered from one distillation stage to provide heat for the next stage. In each stage the pressure and therefore the boiling temperature drops.

Another such solution is the use of a vapor compression distillation device that reduces even further the energy requirements of large scale distillation systems. In vapor compression distillation, the water is evaporated by boiling and the resulting vapor is then compressed, which increases the vapor pressure and therefore temperature.

This vapor is then used to heat up the water in the boiler and in this manner, the latent heat is recovered. Once the vapor compression distillation cycle is started, little further heat is required and the only energy requirement is for the vapor compressor itself.

In the case of small scale distillation systems, in the order of 250 gallons per day or less, the capital costs of multistage distillation and vapor compression distillation make these alternatives unacceptable. Thus all small scale distillation systems use simple distillation at atmospheric pressure and temperature.

The present invention incorporates a number of improvements over conventional simple distillation, such as heat recovery using a refrigeration cycle. Also the present invention creates a vacuum without use of an expensive mechanical pump and combines the normally separate boiler and condenser into one integrated unit.

The result of these innovations is a system that produces high purity distilled water in a batch process, for considerably less energy consumption than the simple distillation method. Also, another advantage of low temperature distillation is the elimination of scaling from the impurities that normally exist in water.

OBJECTS AND ADVANTAGES OF THE INVENTION

Accordingly, besides the objects and advantages of the vacuum distillation system described in my patent above, several objects and advantages of the present invention are:

(a) The main object and advantage of this invention is a novel vacuum distillation process for the production of high purity water, using less energy than conventional simple distillation systems.

(b) Another object and advantage of the present invention is an innovative method of creating a vacuum in the system, which eliminates the need for a mechanical vacuum pump.

(c) Another object and advantage of the present invention is the use of a heater vacuum generating device to allow the distillation of water at low temperature.

(d) Another object and advantage of the present invention is the reduction of scaling on the boiler and condenser units, due to the lower boiling point used thus eliminating the need for descaling and the use of descalant chemicals.

(e) Another object and advantage of the present invention is the use of lower-cost materials due to the lower operating temperatures of the device.

(f) Another object and advantage of the present invention is the lower boiling temperature makes the device safer to handle and operate.

(g) Another object and advantage of the present invention is the combining of the normally separate boiling and condensing functions in a single vessel.

(h) Another object and advantage of the present invention is an innovative method of using an enhanced circulation heat transfer device, which allows a significant reduction in the overall size of the boiler.

(i) Another object and advantage of the present invention is the ease of integration of the invention into the design of a standard refrigeration system, where the refrigerator's condenser and evaporator components can be made integral with the same components in the device.

BRIEF DESCRIPTION OF THE DRAWINGS

FIG. 2a is a schematic of a typical standard household refrigerator showing the location of the batch process water distillation unit.

LIST OF REFERENCE NUMERALS

Figure 1A:
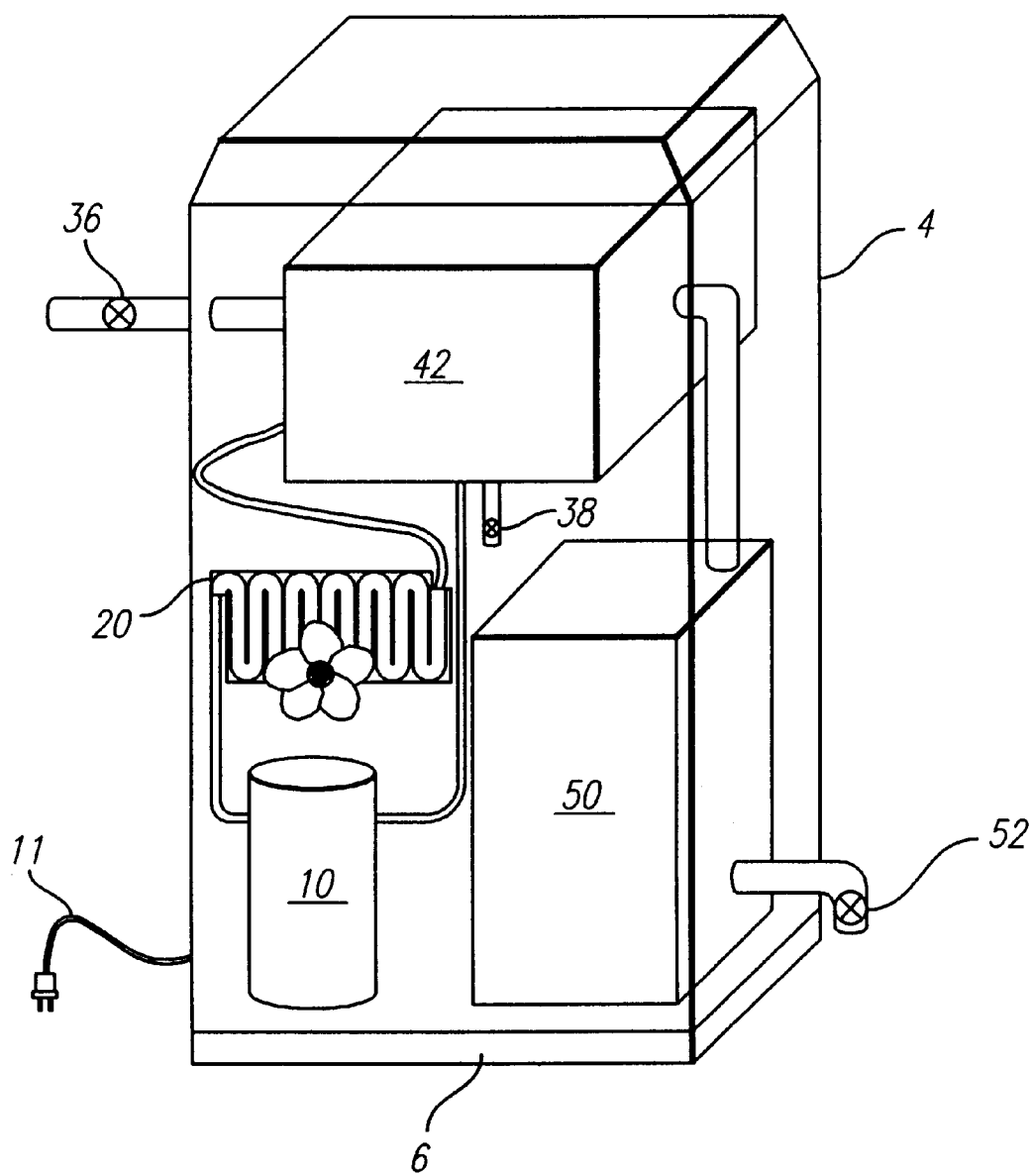
FIG. 1a is a sketch of a typical stand alone batch process distillation unit
Figure 1B:
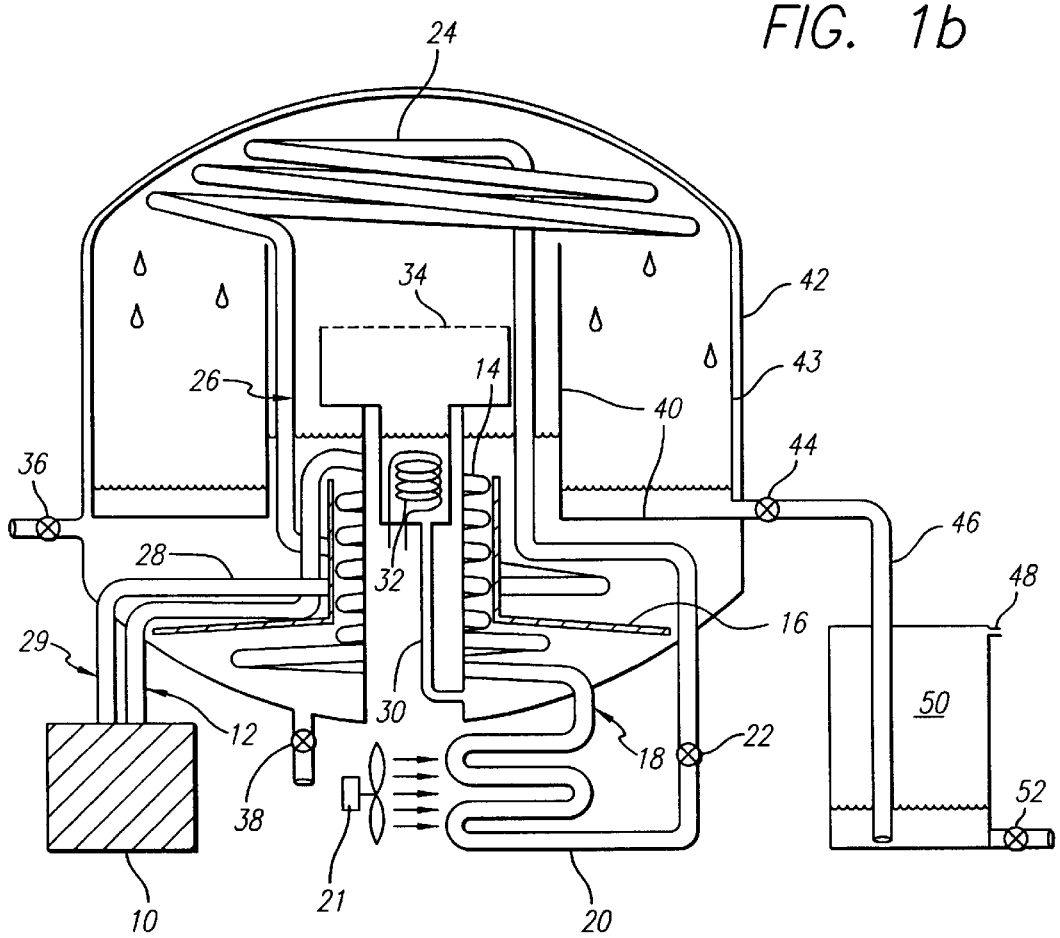
FIG. 1b is a partial cross section of a stand alone batch process distillation unit, showing the various components of the design.

4 Outer Cover
6 Support Base
8 Refrigerator Case
10 Refrigerant Compressor
11 Electrical Power Chord
12 Refrigerant discharge line, start of water evaporator
14 Refrigerant condenser, water evaporator
16 Refrigerator condenser shroud
18 End of water evaporator
20 Radiator
21 Forced draft fan
22 Refrigerant pressure reducing device I
24 Refrigerant evaporator I and steam condenser
26 End of steam condenser, start of the heat exchanger 28 Heat exchanger
29 Suction line of refrigerant compressor
30 Liquid supply connector tube of vapor generator device
32 Heater element of vacuum generator device
34 Vapor separator of vacuum generator device
36 Water inlet valve
38 Drainage valve
40 Distillate collector
42 Distiller vessel
43 Vessel Insulator liner
44 Distillate/air outlet valve
46 Connector tube between distiller vessel and distillate reservoir
48 Air Discharge Vent
50 Distillate reservoir
52 Distillate discharge valve
54 3-way solenoid valve I
56 3-way solenoid valve II
58 Refrigerant pressure reducing device II
60 Refrigerant evaporator II
62 3-way solenoid valve III Description of the Embodiments FIG. 1a shows a typical embodiment of the invention for distillation of water. The embodiment has a compressor (10), a distiller vessel (42) as shown in FIG. 1b, which combines a water evaporator (14), a vacuum generator device (30) to (34), a steam condenser (24) and a distillate collector (40), in one integrated unit and a radiator (20) and a distillate reservoir (50). The embodiment also has a water inlet valve (36), an electrical power chord (11) and a distillate discharge valve (52) and a drainage valve (38), mounted on a support base (6) and the whole embodiment is encased in an outer cover (4).

FIG. 1b shows a detailed view of a stand alone distillation unit which has an outer metal or plastic distiller vessel (42), with a insulator liner (43); the distiller vessel contains a vacuum generating device, made up of a connector tube (30), a heater element (32), and a vapor separator (34).

The distiller vessel (42) also contains a refrigerant condenser coil (14), a refrigerant condenser coil shroud (16), a heat exchanger (28) and a refrigerant evaporator (24) and a water distillate collector (40).

On the outside of the distiller vessel (42) is attached a water inlet valve (36), a distillate/air outlet valve (44) and a drainage valve (38). Connected to the distiller vessel (42) is a refrigerant compressor (10), a radiator (20) that includes a refrigerant pressure reducing device 1(22). The radiator (20) may include a forced draft fan (21).

The distillate reservoir (50), which has a small air discharge vent (48) at the top and a distillate discharge valve (52), is connected to the distiller vessel (42), by a connector tube (46).

FIG. 2a shows a schematic of a typical embodiment of the present invention, integrated into a standard household refrigerator. The schematic shows a distiller vessel (42), which combines a water evaporator (14), a vacuum generating device (30) to (34), a steam condenser (24), a distillate collector (40), a heat exchanger (28) and a shroud (16), in one integrated unit and a compressor (10), a radiator (20), a distillate reservoir (50) and a refrigerant evaporator 11 (60).

Figure 2B:
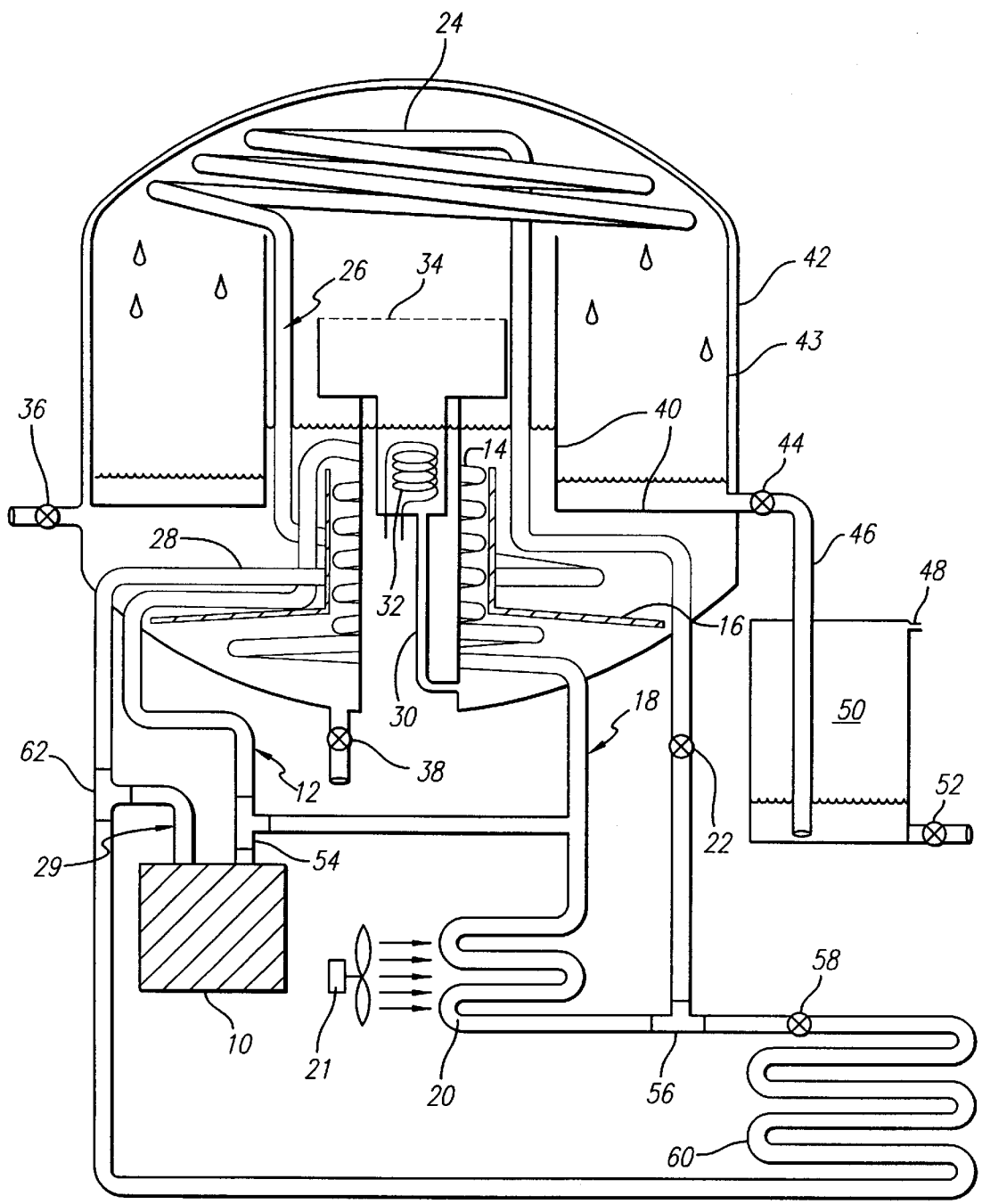
FIG. 2b is a partial cross section of a batch process distillation unit with its own refrigerant evaporator and integrated into a standard household refrigerator.

FIG. 2b shows a detailed view of a partial cross section of a distillation unit with its own refrigerant evaporator and integrated into a standard household refrigerator. Details of the distillation unit is the same as described in FIG. 1b above, except for the addition of three 3-way valves (54), (56) and (62) and a refrigerant pressure reducing device II (58), connected to the refrigerant evaporator II (60).

Figure 2C:
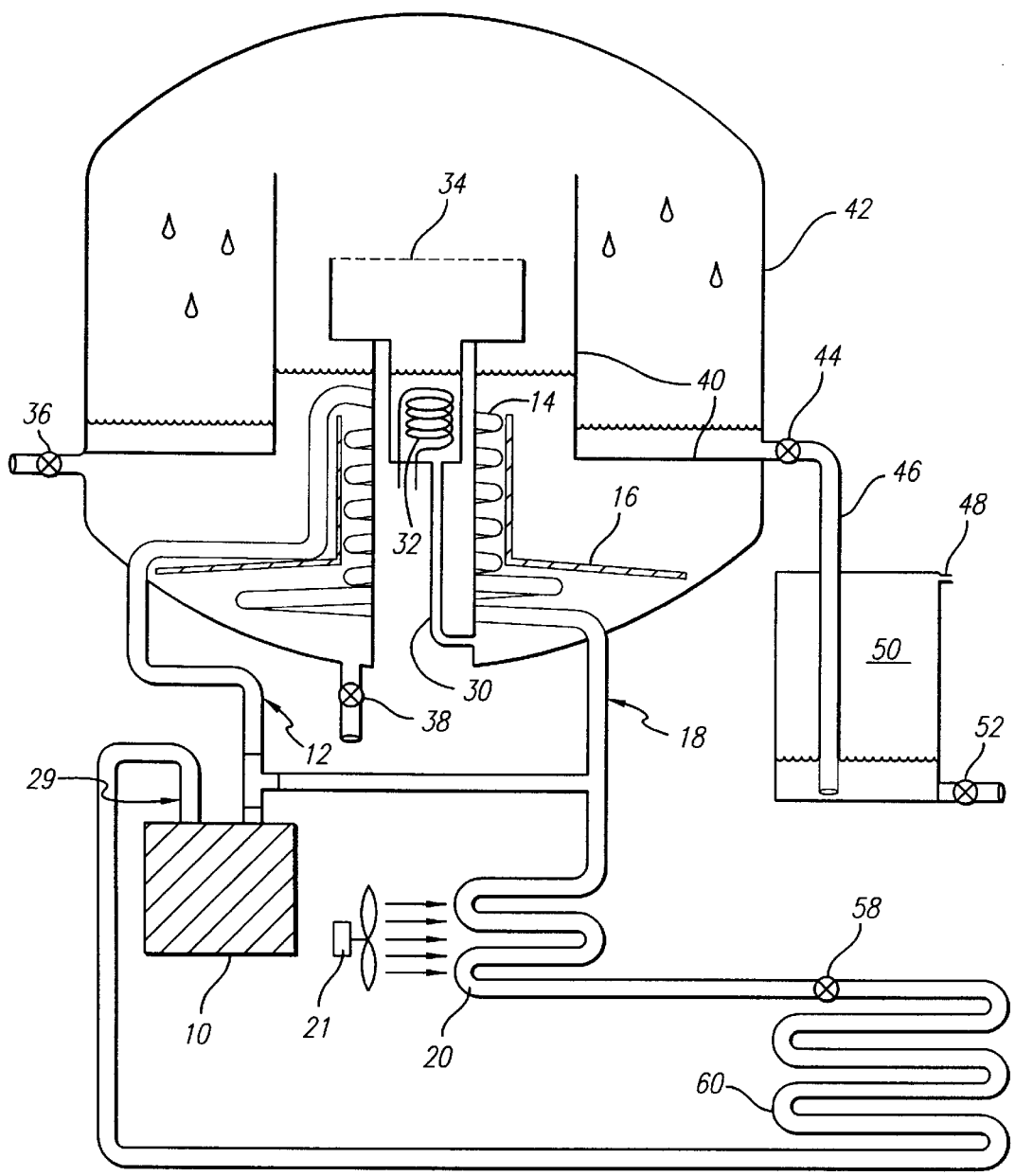
FIG. 2c is a partial cross section of a batch process distillation unit without its own refrigerant evaporator and integrated into a standard household refrigerator.

FIG. 2c is a partial cross section of a distillation unit as described in FIG. 1b above except without its own refrigerant evaporator I (24), refrigerant pressure reducing device I (22), two 3-way valves (56) and (62), and a heat exchanger (28), integrated into a standard household refrigerator the same as described in FIG. 2b above.

Explanation of how the Invention Works or Operates

In order to explain the operation of the system we will describe the stand-alone version and the integrated versions in the following sections.

1. Stand-Alone Distillation System

The basic principle in the proposed batch process distillation stand-alone system is to boil water in the bottom of the vacuum container to generate steam which then passes to a condenser at the top of the vacuum container. The steam is then condensed to distilled water. The proposed distillation system is shown in detail, in FIG. 1b. The process of the invention can be divided into the following phases: water filling, vacuum generating, distillate producing, and distillate discharging.

1.1 Water Filling

Since the invention involves a batch process the first step involves the filling of the distiller vessel (42) with water. To accomplish this, first open distillate/air outlet valve (44) and water inlet valve (36) and close drainage valve (38). Ensure that compressor (10) and heater element (32) are turned off. Fill up distiller vessel (42) with treated water through valve (36) until liquid level is above the vacuum generator heater element (32), then, close water inlet valve (36). The system has now been charged with water.

1.2 Vacuum Generating

The following method of creating a vacuum replaces the need for an expensive vacuum pump and is based on a simple heating device which operates as follows: Turn on heater element (32) to generate steam, while the water is continuously supplied to the heater cavity, from connector tube (30). The steam generated by the heater element (32) also heats the refrigerant vapor inside the refrigerant evaporator (24) to a superheated state. In order to cool the superheated refrigerant, the heat exchanger (28) will reduce the superheated refrigerant temperature sufficiently, to allow the vacuum cycle to proceed.

The vapor generated by heater element (32) is pushed out along with the air initially trapped in distiller vessel (42), through distillate/air outlet valve (44), connector tube (46), and distillate reservoir (50) and is finally released from the top air discharge vent (48) of distillate reservoir (50). Some vapor will be condensed in distillate reservoir (50) when some cold distillate exists.

The inside of distiller vessel (42) is lined with a insulator liner (43) to reduce the condensation of steam on its surface which would stop the steam from displacing air from the vessel. The steam generated by heater element (32) will dilute the air in distiller vessel (42) until after a few minutes, the container is eventually filled almost entirely with steam. Then distillate/air outlet valve (44) is closed and heater element (32) is turned off.

From this point on, the pressure in the distiller vessel (42) will correspond to the steam temperature. When the refrigerant compressor (10) is turned on, steam pressure in the distiller vessel (42) will drop down with steam temperature, thus achieving the vacuum condition during operation of the device. This device will produce vacuum conditions in the range of (27–29)"Hg. This occurs even though the incoming water has not been degassed.

1.3 Distillate Producing

The process of distillate production in a stand-alone device is presented in two parts as follows 1.3.1 Water evaporating and refrigerant condensing and 1.3.2 Steam condensing and refrigerant evaporating.

These are both described in detail in the following subsections.

1.3.1 Water Evaporating and Refrigerant Condensing

The compressor (10) is now turned on and the superheated refrigerant vapor is discharged from the compressor (10). The refrigerant superheated vapor is routed to the top portion of the refrigerant condenser (14), which is a tube coil extending from the point (12) to point (18). The refrigerant condenser coil (14) is divided into two portions. The top portion of the coil (14) is contained inside the cylindrical portion of shroud (16) and the bottom portion of the coil (14) is covered by the disk-shaped portion of shroud (16). The batch of water is heated by the refrigerant under vacuum conditions.

The water is preheated at the bottom portion of the refrigerant condenser (14) and continues to heat up to the top portion of the condenser (14). Water that is 1–2 inches below the water level, reaches a superheated condition and creates a steam/water mixture. The steam/water mixture bursts out from inside of the top portion of the shroud (16) and hits the vapor separator (34).

The steam rises through the vapor separator (34) to the refrigerant evaporator I (24), while the water falls down to the outside of the shroud (16). Due to the density difference between steam and liquid, the water outside the top of the cylindrical portion of shroud (16) is forced downwards and then feeds under the bottom plate portion of the shroud (16) and then rises up the inside of the cylindrical part of the shroud (16). This enhanced circulation heat transfer device raises the convection heat transfer between the water and the refrigerant.

Meanwhile, the refrigerant is continuously condensed to a low vapor ratio state by the water. The low vapor ratio saturated refrigerant is then routed to the radiator (20) and continuously condenses to a liquid state.

1.3.2 Steam Condensing/refrigerant Evaporating

The refrigerant now flows through the refrigerant pressure reducing device I (22) (e.g. expansion valve or capillary tube), into the refrigerant evaporator I (24). The liquid refrigerant temperature drops markedly during the expansion process and the refrigerant becomes a low vapor ratio saturated mixture.

The refrigerant evaporating temperature is selected above 32° F. for water to prevent freezing. The refrigerant inside the refrigerant evaporator I (24), absorbs energy from the steam and the refrigerant evaporator I (24) acts as an evaporating tube to evaporate the refrigerant.

Meanwhile, the steam releases energy and is condensed on the outside of the refrigerant evaporator I (24) which acts as a condenser for the steam in the distiller vessel (42). The condensate falls down to the distillate collector (40). The refrigerant routes into the heat exchanger (28) which extends from point (26) to the inlet of the compressor (10). All refrigerant leaving the heat exchanger should be in single-phase vapor form.

The refrigerant leaving the heat exchanger (28), passes through the suction line (29) to the compressor (10). Here the compression process occurs. The high-pressure vapor then passes through the discharge line to the refrigerant condenser (14), thereby completing the vapor compression refrigeration cycle.

The above refrigeration cycle can also be replaced by an absorption refrigeration cycle. The absorption refrigeration cycle is different from the vapor compression refrigeration cycle as it uses thermal energy instead of mechanical energy to make a change in the conditions necessary to complete a refrigeration cycle.

The use of a refrigeration cycle creates a performance increase by the ratio of the amount of energy released from the refrigerant evaporator I(24) divided by the energy input to the refrigerant compressor (10), thus creating a significant energy saving when compared to a simple distillation system.

The distilled water production is continuous from the above described water distillation loop until the distillate collector (40) is filled.

1.4 Distillate Discharging

The next part of the batch distillation process is discharge of the distillate from the collector into an external reservoir. First open drainage valve (38) which allows air to enter the system and break the vacuum. The distillate outlet valve (44) is now opened and the distillate is discharged by gravity to the distillate reservoir (50). The next cycle will restart at this point.

2. Distillation System Integrated into a Standard Household Refrigerator.

There are two basic preferred embodiments, for integration of the invention into a household refrigerator as described in sections 2.1 and 2.2 below.

2.1 Water Distillation Device with Refrigerant Evaporator

This system is composed of two loops, one is the water distillation loop and the other is the refrigeration loop. In the case of the water distillation loop it is the same as described in section 1.3 above. In the second case the refrigeration loop is controlled by means of three 3-way valves (54), (56) and (62). Thus the refrigerant leaving the compressor (10) to the radiator (20) and through the refrigerant pressure reducing device II (58) enters the refrigerator evaporator II (60) to complete the refrigeration cycle.

2.2 Water Distillation Device without a Refrigerant Evaporator.

This embodiment is the same as that described in detail in section 2.1 above except the refrigerant evaporator I (24) is deleted and the refrigerant is routed into the refrigerator evaporator II (60) and the top of the distiller vessel (42) acts as the steam condenser when it is cooled by cold air supplied from the refrigerator evaporator II (60).

Summary, Ramifications and Scope

Accordingly, the reader will see that the compact vacuum distillation device of this invention can be used to produce distilled water with significantly reduced energy consumption when compared with simple distillation systems. The compact vacuum distillation system has the additional advantages in that:

- it permits the reduction of energy consumption to less than (25–50)% of simple distillation systems
- the size of the vacuum distillation system is reduced due to the combining of the water evaporator and steam condenser into one vessel and the generation of enhanced convection by use of a shroud in the water evaporator.
- it utilizes a device for creation of a vacuum without the use of a vacuum pump, thus allowing use of a refrigeration cycle as a heating source for producing steam.

the use of the heater vacuum generating device reduces the overall size of the unit.

it reduces the formation of scaling due to the lower boiling temperature thus eliminating the need for descaling or the use of descalant chemicals.

the design is easily integrated into a conventional refrigerator where the refrigerator's condensing and evaporating components can be made integral with same components in the device.

it allows the use of lower-cost materials due to the lower temperatures used.

it makes the device inherently more safe too use and operate due to the lower boiling temperature created by the vacuum.

While the above description contains many specificities, these should not be construed as limitations on the scope of the invention, but rather as an exemplification of one preferred embodiment thereof.

Many other variations are possible. For example, the vessel can have many other volumetric shapes such as oval, circular, square, etc. and the liquid to be distilled can be other than water such as ethylene glycol, sea water, etc.

Accordingly the scope of the invention should be determined not by the embodiments illustrated but by the appended claims and their legal equivalents.

We claim:

1. An integrated apparatus for batch distilling a liquid, said apparatus comprising:

(a) an evaporator having a valved entry port and for receiving a batch of liquid in a first atmospheric condition;

(b) a distillate collector for receiving distillate and in communication with said evaporator;

(c) a vacuum generator device disposed in communication with said evaporator and said distillate collector and for receiving the batch of liquid in the first atmospheric condition, said vacuum generator device comprising a heating element for timed intermittent vaporizing of said batch of liquid, a connector supply tube admitting a quantity of said liquid to said vacuum generator device, said vacuum generator device eliminating the need for a vacuum pump;

(d) a valved vent for sealing said apparatus from outside atmosphere to form a second atmospheric condition sealed from the atmosphere after said heating element vaporizes said liquid into vapor to purge said first atmospheric condition from said apparatus through said valved vent;

(e) a condenser disposed between said evaporator and said distillate collector for condensing said vapor at a pressure below said first atmospheric condition, wherein said evaporator and condenser are integrated as a unit.

2. The apparatus of claim 1 further comprising a reservoir in communication with said distillate collector for receiving distillate from said condenser, a second tube communicating with said reservoir and said distillate collector.

3. The apparatus of claim 2 wherein said valved vent is disposed from said second tube.

4. The apparatus of claim 1 further comprising a condensing coil and an evaporation coil of a refrigeration system in communication with said evaporator and said vacuum generator device.

5. The apparatus of claim 1 further comprising a vapor separator for separating entrained liquid from the vapor, said separator disposed between said evaporator and said condenser.

\* \* \* \* \*